(12) United States Patent
Anderson et al.

(10) Patent No.: US 11,635,552 B2
(45) Date of Patent: Apr. 25, 2023

(54) OPTICAL ELEMENT CONTROL

(71) Applicant: Optos PLC, Dunfermline (GB)

(72) Inventors: Alan Anderson, Dunfermline (GB); Praveen Ashok, Dundermline (GB); Hiroshi Kasai, Tokyo (JP); Alistair Gorman, Dundermline (GB)

(73) Assignee: OPTOS PLC, Dunfermline (GB)

( * ) Notice: Subject to any disclaimer, the term of this patent is extended or adjusted under 35 U.S.C. 154(b) by 470 days.

(21) Appl. No.: 16/636,999

(22) PCT Filed: Aug. 14, 2017

(86) PCT No.: PCT/EP2017/070577
§ 371 (c)(1),
(2) Date: Feb. 6, 2020

(87) PCT Pub. No.: WO2019/034229
PCT Pub. Date: Feb. 21, 2019

(65) Prior Publication Data
US 2020/0166676 A1 May 28, 2020

(51) Int. Cl.
*G02B 3/14* (2006.01)
*G02B 26/10* (2006.01)

(52) U.S. Cl.
CPC ............ *G02B 3/14* (2013.01); *G02B 26/105* (2013.01); *G02B 2207/115* (2013.01)

(58) Field of Classification Search
CPC .. G02B 3/14; G02B 26/105; G02B 2207/115; G02B 26/005; G09G 3/348; G02C 7/085
See application file for complete search history.

(56) References Cited

U.S. PATENT DOCUMENTS

| 5,187,364 A | 2/1993 | Blais |
| 9,482,868 B2 | 11/2016 | Sasaki et al. |

(Continued)

FOREIGN PATENT DOCUMENTS

| DE | 11 2013 004379 T5 | 5/2015 |
| FR | WO2006/103281 A1 | 10/2006 |

(Continued)

OTHER PUBLICATIONS

Bruno Berge et al, "Liquid lens based on electrowetting: actual developments on larger aperture and multiple electrodes design for image stabilization or beam steering", Proc. of SPIE vol. 8616, Mar. 2013, p. 861612-1 to 861612-9.

(Continued)

*Primary Examiner* — James C. Jones
(74) *Attorney, Agent, or Firm* — DeLucia, Mlynar & Associates LLP

(57) ABSTRACT

An optical system comprising: an optical element having an optical property responsive to an applied signal, a variation of the optical property with the signal exhibiting hysteresis in a first range of values and no hysteresis in a second range of values of the signal; a memory storing data representing a hysteresis curve which indicates the variation of the optical property with increasing and decreasing values of the signal; and a controller which continuously controls the optical property by: generating, based on the stored data, a cyclic signal having a discontinuity in each cycle of the cyclic signal, and setting the discontinuity size in each cycle based on the stored data such that a part of the variation of the optical property with the cyclic signal coincides with a part of the variation represented by the stored data; and applying the cyclic signal to the optical element.

14 Claims, 14 Drawing Sheets

(56) References Cited

U.S. PATENT DOCUMENTS

2002/0176148 A1* 11/2002 Onuki ................ H04N 5/23241
359/254
2007/0195739 A1   8/2007 Li
2010/0243862 A1   9/2010 Nunnink

FOREIGN PATENT DOCUMENTS

WO  WO2009/085613 A1    7/2009
WO  WO-2017003939 A1 *  1/2017  ............. G09G 3/348
WO  WO2017003939 A1     1/2017

OTHER PUBLICATIONS

International Search Report issued in international application No. PCT/EP2017/070577.
Written opinion of the International Searching Authority issued in international application No. PCT/EP2017/070577.
U.S. Appl. No. 16/637,023, filed Feb. 6, 2020.
U.S. Appl. No. 16/637,052, filed Feb. 6, 2020.
U.S. Appl. No. 16/637,075, filed Feb. 6, 2020.

* cited by examiner

OPTICAL ELEMENT CONTROL

This application is a national phase filing under 37 U.S.C. § 371 based on International Application No. PCT/EP2017/070577, filed Aug. 14, 2017, and claims the benefit of priority of that International Application. The contents of the International Application are incorporated by reference herein.

TECHNICAL FIELD

The present invention relates to optical systems and, more particularly, to the control of an optical property of an optical element.

BACKGROUND

Optical imaging systems are used in a variety of different fields, such as ophthalmic imaging. Ophthalmic imaging relates to the imaging of parts of the eye, such as the retina, which can allow early signs of disease or pathology to be detected.

It is often desirable to control an optical property of the imaging system during image acquisition. For example, it is preferable to provide an imaging system with the capability to vary its focal length while the surface is being imaged, so that an in-focus image of a curved surface can be obtained, or so that an in-focus image of a flat or curved surface can be obtained with an imaging system using an optical component with a curved surface. As another example, it may be desirable to vary the scan angle of a raster scan pattern using an oscillating mirror such that some play in the mirror's movement mechanism can be compensated for. As yet another example, it may be desirable to vary the intensity of light used to back-light a sample of spatially varying thickness in transmission microscopy in order to obtain an image with uniform exposure, in which features across the sample can be easily viewed and compared.

SUMMARY

Optical systems having a variable optical property often exhibit a hysteresis in the variation of the optical property with a control signal applied to an optical element of the optical system that is used to control the optical property. This hysteretic behaviour can degrade image quality of the imaged surface.

With this problem in mind, the present inventors have devised an optical system comprising an optical element responsive to an applied signal to vary an optical property of the optical element, the variation of the optical property with the applied signal exhibiting hysteresis in a first range of values of the signal, and no hysteresis in at least one second range of values of the signal. The optical system further comprises a memory storing data representative of a variation of the optical property with either increasing values of the signal or decreasing values of the signal, and a controller configured to control the optical property of the optical element by generating a control signal based on the stored data and applying the generated control signal to the optical element. In a case where the memory stores data representative of the variation of the optical property with increasing values of the signal, the controller is configured to use the stored data to change the value of the optical property from an initial value corresponding to a first value of the signal, to a subsequent value corresponding to a second value of the signal that is smaller than the first value of the signal, by setting the value of the control signal to a third value that is within the second range of values, and subsequently increasing the value of the control signal from the third value to the second value. Alternatively, in a case where the memory stores data representative of the variation of the optical property with decreasing values of the signal, the controller is configured to use the stored data to change the value of the optical property from an initial value corresponding to a first value of the signal, to a subsequent value corresponding to a second value of the signal that is greater than the first value of the signal, by setting the value of the control signal to a third value that is within the second range of values, and subsequently decreasing the value of the control signal from the third value to the second value.

The inventors have further devised method of controlling an optical property of an optical element, wherein the optical element is responsive to an applied signal to vary the optical property, and the variation of the optical property with the applied signal exhibits hysteresis in a first range of values of the electrical signal, and no hysteresis in a second range of values of the signal. The method comprises: storing data representative of the variation of the optical property with either increasing values of the signal or decreasing values of the signal; and generating a control signal based on the stored data, and applying the generated control signal to the optical element. In a case where the memory stores data representative of the variation of the optical property with increasing values of the signal, the value of the optical property is controlled to change from an initial value, corresponding to a first value of the signal, to a subsequent value, corresponding to a second value of the signal that is smaller than the first value of the signal, by setting the value of the control signal to a third value that is within the second range of values, and subsequently increasing the value of the control signal from the third value to the second value. Alternatively, in a case where the memory stores data representative of the variation of the optical property with decreasing values of the signal, the value of the optical property is controlled to change from an initial value, corresponding to a first value of the signal, to a subsequent value, corresponding to a second value of the signal that is greater than the first value of the signal, by setting the value of the control signal to a third value that is within the second range of values, and subsequently decreasing the value of the control signal from the third value to the second value.

In embodiments of the above system and method, in the case where the memory stores data representative of the variation of the optical property with increasing values of the signal, where the controller uses the stored data to change the value of the optical property from an initial value corresponding to a first value of the signal, to a subsequent value corresponding to a second value of the signal that is larger than the first value of the signal, the control signal is not set to a third value that is within the second range of values, and subsequently increased from the third value to the second value. Instead, the value of the signal is increased from the first value to the second value, since no inaccuracies caused by hysteresis would arise in this case.

Similarly, in embodiments of the above system and method, in the case where the memory stores data representative of the variation of the optical property with decreasing values of the signal, where the controller uses the stored data to change the value of the optical property from an initial value corresponding to a first value of the signal, to a subsequent value corresponding to a second value of the signal that is smaller than the first value of the signal, the control signal is not set to the third value that is within the second range of values and subsequently decreased from the third value to the second value. Instead, the controller is configured to change the value of the signal from the first value to the second, smaller value, since no inaccuracies caused by hysteresis would arise in this scenario.

The inventors have further devised an optical system comprising an optical element responsive to an applied signal to vary an optical property of the optical element, the variation of the optical property with the applied signal exhibiting hysteresis in a first range of values of the signal, and no hysteresis in a second range of values of the signal. The optical system further comprises a memory storing data representative of the variation of the optical property with either increasing values of the signal or decreasing values of the signal, and a controller configured to control the optical property of the optical element by: generating, based on the stored data, a cyclic signal having one or more discontinuities in each cycle of the cyclic signal, and setting the size of at least one of the one or more discontinuities in each cycle based on the stored data or live system response such that a part of the variation of the optical property with the cyclic signal coincides with a part of the variation represented by the stored data; and applying the cyclic signal to the optical element.

The inventors have further devised a method of controlling an optical property of an optical element, wherein the optical element is responsive to an applied signal to vary the optical property, and the variation of the optical property with the applied signal exhibits hysteresis in a first range of values of the electrical signal, and no hysteresis in a second range of values of the signal. The method comprises: storing data representative of the variation of the optical property with either increasing values of the signal or decreasing values of the signal; generating, based on the stored data, a cyclic signal having one or more discontinuities in each cycle of the cyclic signal, the size of at least one of the one or more discontinuities in each cycle being based on the stored data or live system response such that a part of the variation of the optical property with the cyclic signal coincides with a part of the variation represented by the stored data; and applying the cyclic signal to the optical element.

BRIEF DESCRIPTION OF THE DRAWINGS

Embodiments of the invention will now be explained in detail, by way of example only, with reference to the accompanying figures, in which.

DESCRIPTION OF EMBODIMENTS

Figure 1:
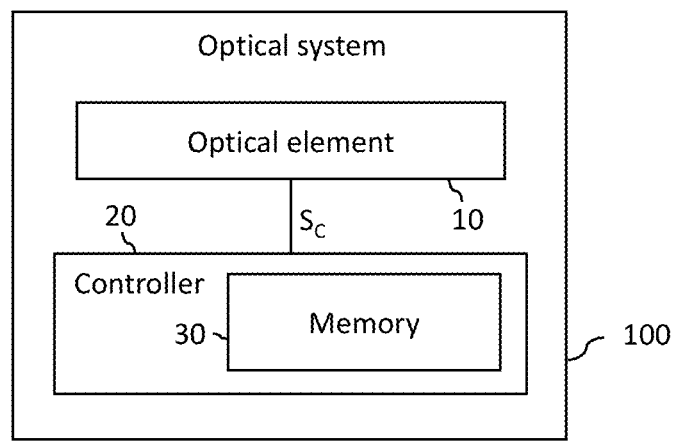
FIG. 1 is a schematic illustration of an optical system according to embodiments of the present invention.

An optical system 100 according to an embodiment of the present invention is shown schematically in FIG. 1. The optical system 100 comprises an optical element 10, and a controller 20 having a memory 30. These components of the optical system 100 are described in more detail below. Other well-known components of the optical system 100 that are not necessary for understanding the present invention (such as a beam delivery pre-focussing optical system and a post-processing optics, control systems therefor, etc.) are not illustrated or described herein, for sake of clarity. The optical system 100 implements a dynamic focusing mechanism that can be used to compensate for systematic and target-related focus changes to ensure that an optical imaging system remains in focus with respect to a target, and may be used for correcting optical power change of a ellipsoidal mirror of an ophthalmoscope, for example. The control techniques described herein may be applicable for an imaging system where light is delivered and collected through the same beam delivery mechanism, or where light is only collected or delivered to a target.

The optical element 10 may, as in the present embodiment, be provided in the exemplary form of a liquid lens. The optical element 10 is responsive to a control signal $S_C$ applied thereto by the controller 20 to vary, as an example of an optical property of the optical element 10 that can be varied by the applied control signal $S_C$, the focal length of the optical element 10. As will be described in more detail below, the variation of the optical property with an applied signal shows hysteresis in a first range of values of the signal, and no hysteresis in at least one second range of values of the signal. It should be noted, however, that hysteretic behaviour is not specific to liquid lenses, and may also be observed in a variety of other optical components. For example, some types of thin-film membranes show hysteresis in transmitted light intensity as incident light intensity is increased and decreased (and vice versa) over a common range of values.

Furthermore, an optical scanning element, which comprises a member having reflective surface for reflecting light that is configured to rotate about an axis (such as oscillating mirror that can be used to vary a scan angle of an optical scanner, for example a polygonal mirror or galvo mirror used in a scanning laser ophthalmoscope, SLO) under the control of a drive mechanism may exhibit hysteresis that is dependent upon the movement direction of the reflective surface. For example, an oscillating mirror may yield a certain scan angle when moving to a particular position in one direction, but yield a different scan angle when moving to the nominally same position from the opposite direction. The "mismatch" in the scan angle that is dependent upon the movement direction of the scanning element may be caused by play in the mechanism that is used to rotate the scanning element.

An optical property of a liquid lens or other type of optical element, such as its focal length, can be varied in one of a number of different ways. For example, a signal in the form of pressure changes applied to the liquid lens may be used to deform a fluid-filled membrane of the liquid lens. The application of different pressures can produce different curvatures of the fluid inside the membrane and thus vary the focal length of the lens. However, in the present embodiment, the variation of the focal length of the lens is based on the electrowetting principle, as described in more detail below.

The controller 20 is configured to control the optical property of the optical element 10 by generating the control signal $S_C$ using data stored in the memory 30 that is described in more detail below, and applying the generated control signal $S_C$ to the optical element 10. The controller 20 may be implemented in a number of different ways.

Figure 2:
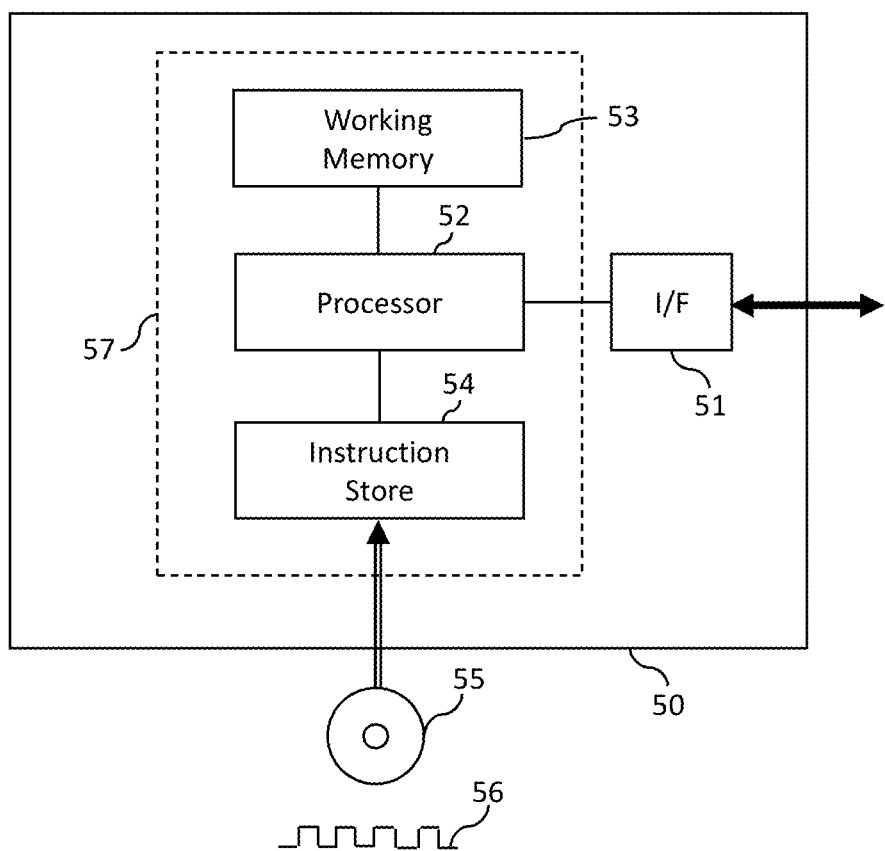
FIG. 2 is a schematic illustrating an implementation of the controller shown in FIG. 1 in programmable signal processing hardware.

FIG. 2 shows an exemplary implementation of the controller 20 in programmable signal processing hardware, which may take the exemplary form of a personal computer (PC) or the like. The signal processing apparatus 50 shown in FIG. 2 comprises an interface (I/F) section 51 for outputting the control signal $S_C$, and optically for receiving instructions from an external computer or the like (not shown) for setting different values of the focal length of the optical element 10. The signal processing apparatus 50 further comprises a processor 52, a working memory 53 and an instruction store 54 storing computer-readable instructions which, when executed by the processor 52, cause the processor 52 to perform the processing operations hereinafter described to control the focal length of the optical element 10. The instruction store 54 may comprise a ROM which is pre-loaded with the computer-readable instructions. Alternatively, the instruction store 54 may comprise a RAM or similar type of memory, and the computer-readable instructions can be input thereto from a computer program product, such as a computer-readable storage medium 55 such as a CD-ROM, etc. or a computer-readable signal 56 carrying the computer-readable instructions.

In the present embodiment, the combination 57 of the hardware components shown in FIG. 2, comprising the processor 52, the working memory 53 and the instruction store 54, is configured to implement the functionality of the controller 20. The instruction store 54 may serve as the memory 30 shown in FIG. 1. It should be noted, however, that the memory 30 need not form part of the controller 20, and may alternatively be provided as an external components that is communicatively coupled to the controller 20 in any appropriate way known to those skilled in the art, for example via a network such as a local area network (LAN) or the Internet.

It should be noted that the controller 20 need not be implemented in programmable signal processing hardware of the kind described above, and may alternatively be implemented in dedicated hardware such an appropriately configured field-programmable gate array (FPGA), for example.

The memory 30 may be any kind of data storage device well-known to those skilled in the art, and stores data (also referred it herein as a "calibration curve") representative of a variation of the optical property of the optical element 10 with either increasing values of an applied signal or decreasing values of the applied signal. More particularly, the memory 30 may, as in the present embodiment, store values indicative of a measured focal length of the optical element 10 for corresponding values of the electrical signal applied by the controller 20, wherein the focal length is measured for each increment in the value of the applied signal. However, in an alternative embodiment, the memory 30 may store values indicative of a measured focal length of the optical element 10 for corresponding values of the applied signal, wherein the focal length is measured as a function of decreasing values of the signal. The data representative of the variation of the optical property with increasing or decreasing values of the applied signal need not, however, be provided in the form of correlated measured values of the optical property and of the applied signal, and may alternatively be represented by a function representing the variation, which may be derived from experimental results or by modelling of the behaviour of the optical element 10, for example.

The operation of the liquid lens as an example of the optical element 10 in the present embodiment will now be described with reference to FIGS. 3(*a*) to 3(*c*), which figures illustrate the liquid lens of the present embodiment in different states of operation.

Figure 3A:
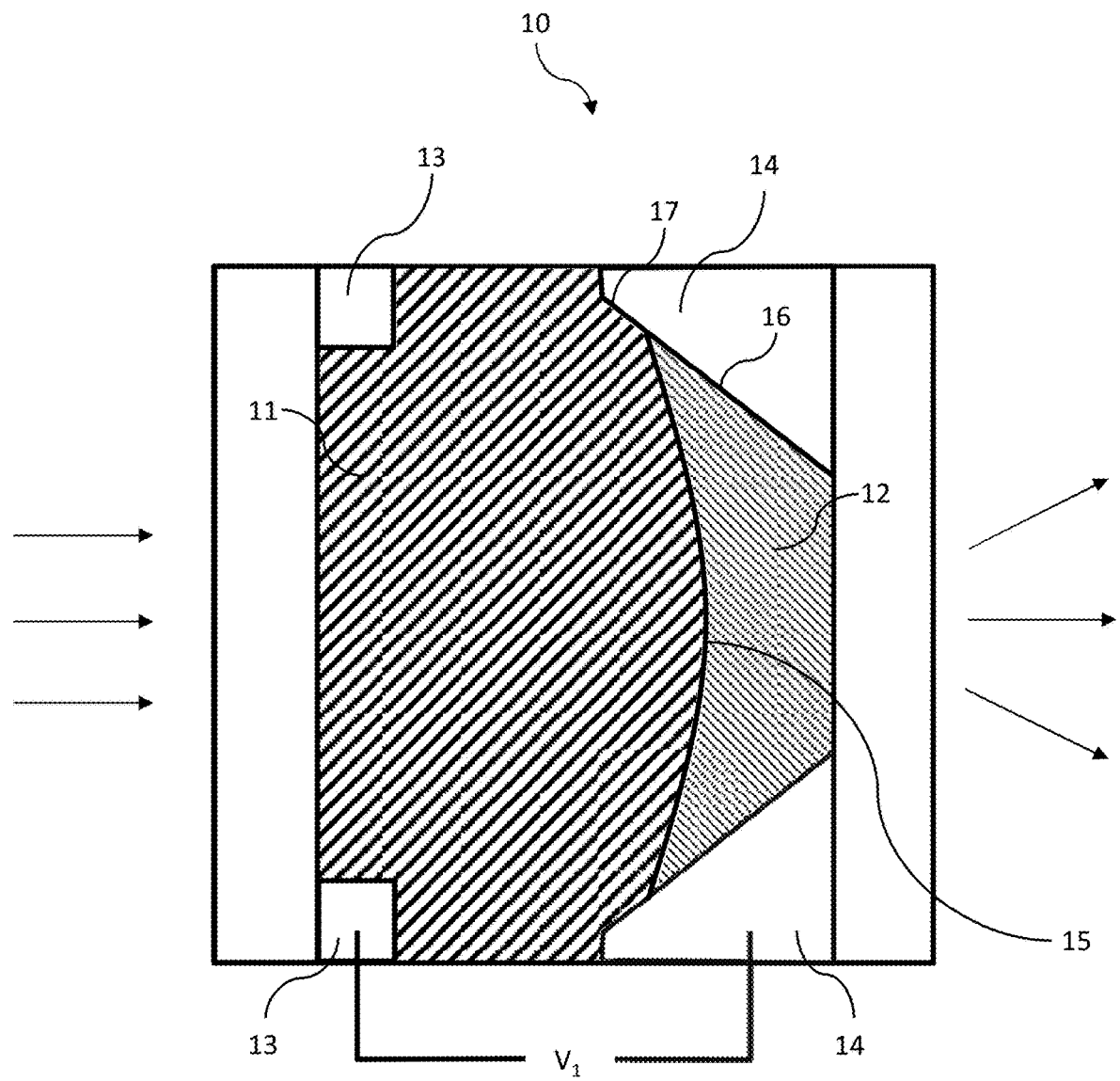
FIGS. 3(a) to 3(c) are illustrations of a liquid lens with a variable focus in three different states of operation.
Figure 3B:
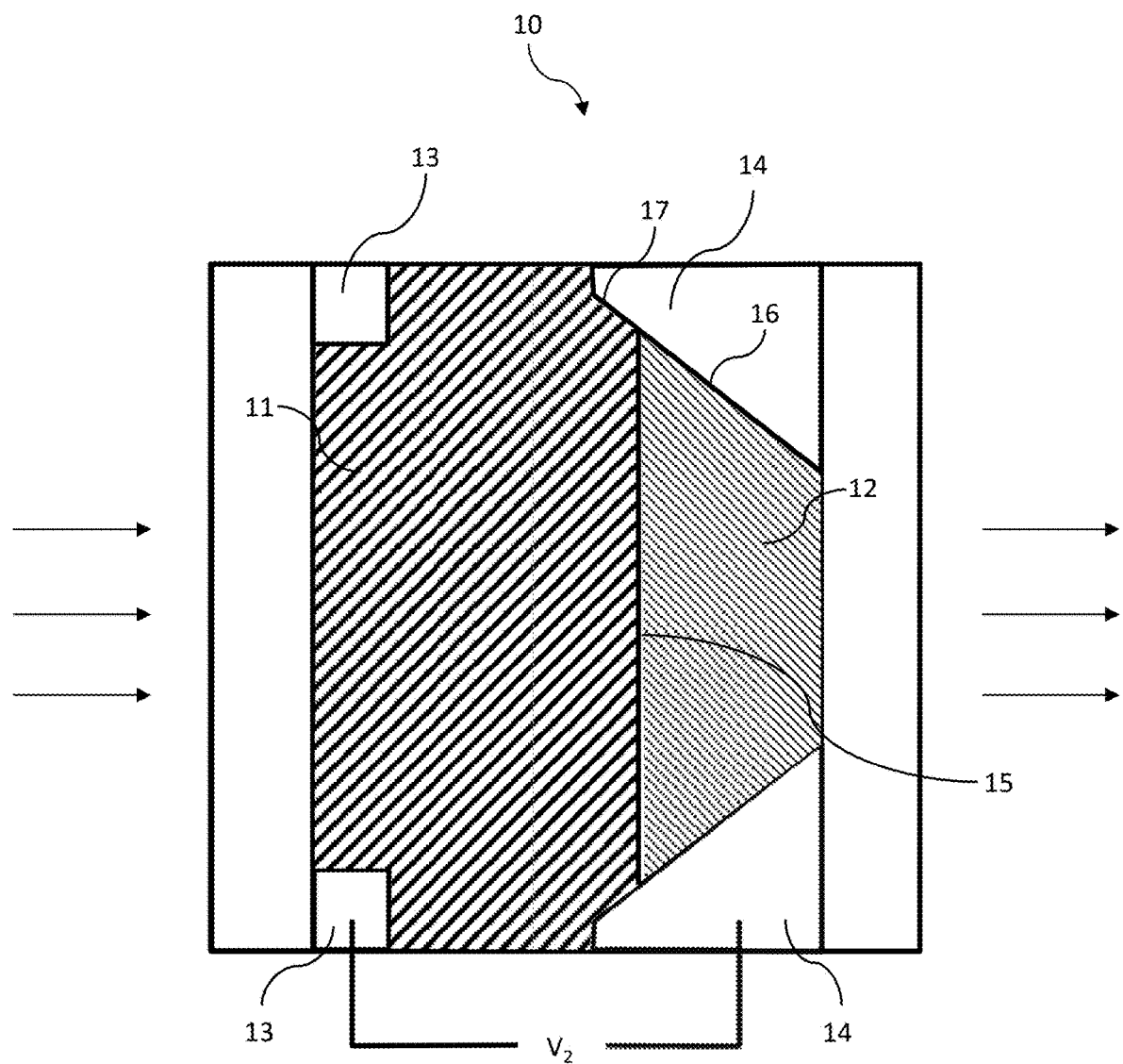

As illustrated in FIG. 3(*a*), the liquid lens may comprise two immiscible liquids, namely a first liquid 11 and a second liquid 12, that are disposed between two electrodes, 13 and 14, and are both substantially transparent. By way of example, the first liquid 11 may be water, and the second liquid 12 may be oil. The oil-water interface 15, the oil-electrode interface 16 and the water-electrode interface 17 all have an associated Gibbs free energy. The Gibbs free energies associated with the oil-electrode interface 16 and the water-electrode interface 17 influence the angle of curvature of the interface 15 between the two immiscible liquids 11 and 12. Other types of electrowetting liquid lenses operate on a similar principle but may vary in their structure. For example, other types of electrowetting liquid lenses may only have a single transparent or translucent liquid, and may vary the curvature of this single liquid.

The curvature of the interface 15 between the two immiscible liquids 11 and 12 can be varied by applying the control signal $S_C$ to the electrodes 13 and 14, which signal changes the Gibbs free energy of the solid-liquid interfaces. The applied signal may, as in the present embodiment, correspond to an applied voltage, or may alternatively be a current signal.

As illustrated in FIG. 3(*a*), an applied signal corresponding to a voltage $V_1$ produces a corresponding water contact angle at the water-electrode interface 17. This water contact angle influences the curvature of the oil-water interface 15. In FIG. 3(*a*), the curvature of the oil-water interface 15 is convex, and therefore any light incident on the liquid lens will be made to diverge by the liquid lens, as represented by the arrows in this figure.

As shown in FIG. 3(*b*), under a different applied voltage $V_2$, the water contact angle at the water-electrode interface 17 is changed, thereby changing the curvature of the oil-water interface 15. With an applied signal corresponding to a voltage $V_2$, the oil-water interface 15 becomes flat (neither concave nor convex), such that light incident on the liquid lens is unaffected (neither diverged nor converged) by the liquid lens, as represented by the arrows in this figure.

Figure 3C:
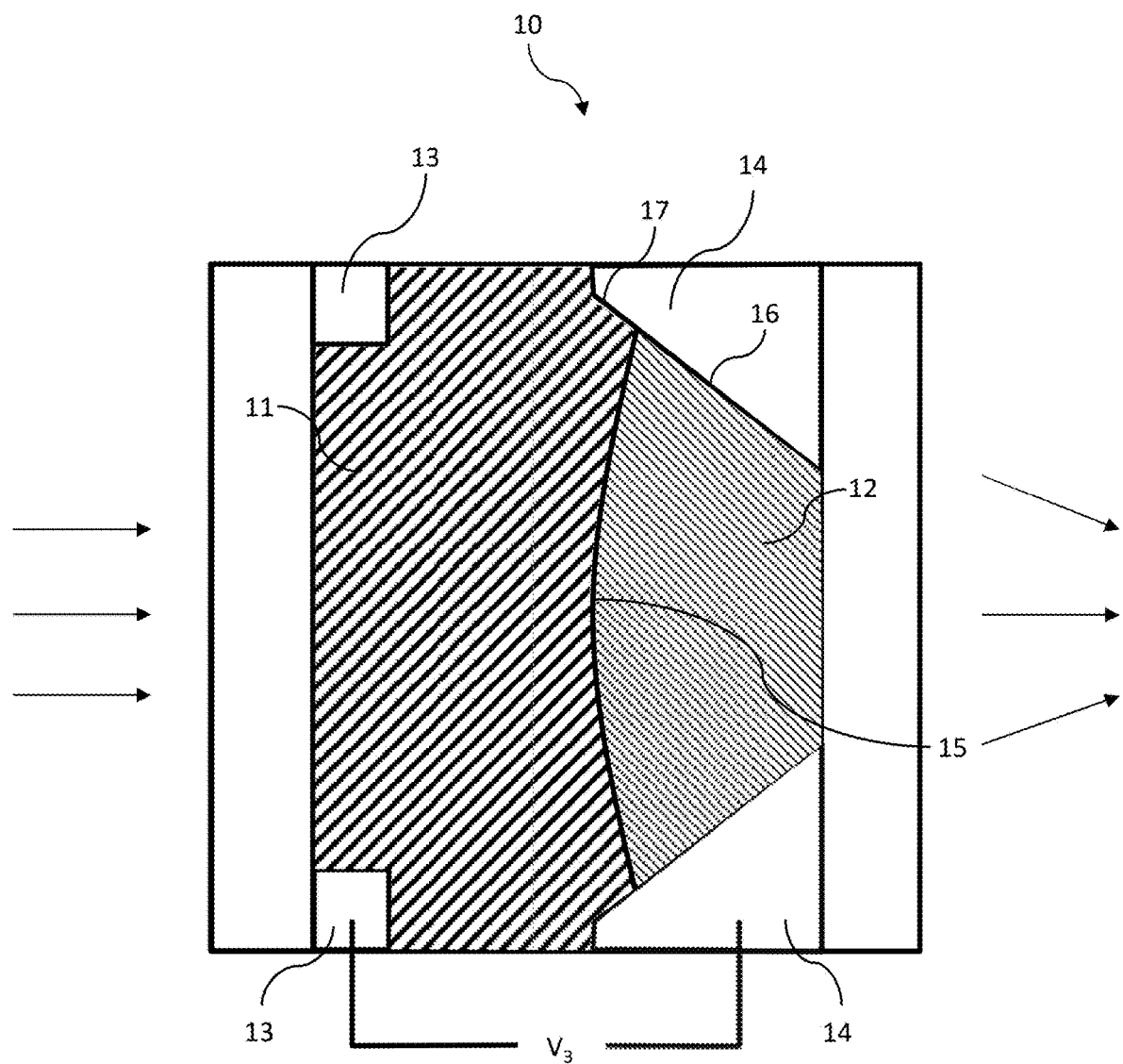

If the signal applied by the controller 20 is changed further (for example, see FIG. 3(*c*), in which the applied voltage is changed to $V_3$), the water contact angle between the water 11 and the surface of the electrode 14 is changed still further, thereby further changing the curvature of the oil-water interface 15. In FIG. 3(c), the curvature of this oil-water interface 15 is concave, such that light incident on the liquid lens is converged by the liquid lens, as illustrated by the arrows in this figure.

Liquid lenses of this kind are suitable for use in ophthalmic applications, since their optical properties may be rapidly and accurately controlled using an applied voltage. This type of focussing mechanism can be driven as a function of another systemic parameter.

However, these types of liquid lenses exhibit hysteresis effects, which can cause errors in the set focal lengths and the like of the liquid lens. As will be described in the following, the calibration and the drive mechanism employed in embodiments of the invention compensate for these hysteresis effects.

The hysteresis effects arise due to the behaviour of the water contact angle at the water-electrode interface 17 of the liquid lens. Specifically, this water contact angle will be different for a particular value of applied voltage from the controller 20 depending on whether the applied voltage across the liquid lens has been increased from a smaller voltage to that value, or decreased from a larger voltage value to that value.

As noted above, the water contact angle at the water-electrode interface might be different for a particular voltage value if the applied voltage was increased to reach that particular voltage value than if the applied voltage was decreased to reach that particular voltage value. An increase in voltage would cause the water contact angle at the water-electrode interface 17 to assume an advancing water contact angle, whereas a decrease in voltage would lead the water contact angle of the water-electrode interface 17 to assume a receding water contact angle. In general, advancing water contact angles are larger than receding water contact angles. Since the curvature of the oil-water interface 15 depends on the water contact angle at the water-electrode interface 17, any differences in the water contact angle (such as the difference between an advancing water contact angle and a receding water contact angle) would produce a difference in the curvature of the oil-water interface 15, and this difference in curvature would affect the converging/diverging action of the liquid lens, thereby changing its focal length.

Figure 4:
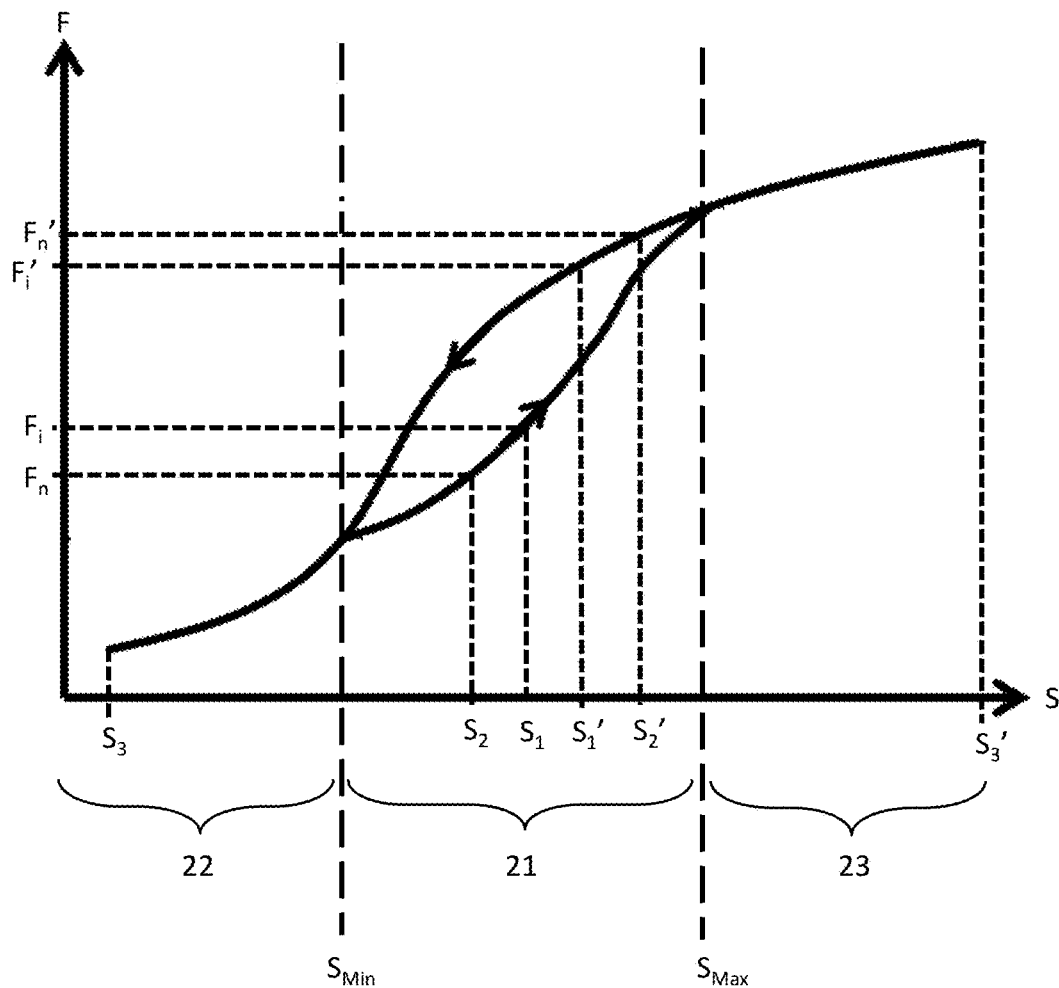
FIG. 4 is a schematic illustration of the variation of the focal length of the liquid lens in the embodiment with an applied drive signal, which exhibits hysteresis.

FIG. 4 is a schematic illustration of how the focal length, F, of the liquid lens changes as a function of both increasing and decreasing values of a drive voltage signal S that is applied to the electrodes of the liquid lens, wherein the direction of change of the drive signal S (towards higher or lower values) is shown by the arrows in the two parts of the hysteresis curve. As can be seen in FIG. 4, in a first range of values of the drive signal S (shown at 21 in FIG. 4) that lies between $S_{Min}$ and $S_{Max}$, the variation of the focal length F of the liquid lens with the applied drive signal S exhibits hysteresis, while no hysteresis is present in the ranges 22 and 23 of the applied drive signal S that are on either side of the range 21, i.e. for $S>S_{Max}$ and $S<S_{Min}$. In ranges 22 and 23, where no hysteresis occurs, there is a one-to-one correspondence between the value of S and the resulting focal length F. On the other hand, in hysteresis range 21, the values of focal length F depend on whether the drive signal S is increasing or decreasing.

The aforementioned data that is stored in memory 30 may, as in the present embodiment, represent the variation of the focal length F of the liquid lens from the minimum value, $S_3$, of the drive signal S shown in FIG. 4 to the maximum value, $S_3'$, of the drive signal. Although the stored variation thus covers regions 21 to 23, it need not cover both of regions 22 and 23, and may alternatively cover regions 21 and 22 (or parts thereof) only, for example. Alternatively, the stored data may represent the variation of the focal length F of the liquid lens from the maximum value $S_3'$ of the drive signal S shown in FIG. 4 to the minimum value $S_3$ of the drive signal S shown in FIG. 4, covering regions 21-23, or regions 21 and 23 (or parts thereof) only, for example.

The controller 20 of the present embodiment is configured to operate in a 'step-and-lock' mode to generate control signals $S_C$ such that changes in the focal length F of the liquid lens that occur in response to changes in the control signal $S_C$ follow the stored variation not only for increases in the value of $S_C$ but also for decreases in the value of $S_C$. In this mode of operation, the rate of change of focus drive is greater than or equal to the settling time of the focus mechanism. There is therefore a one-to-one correspondence between each applied value of the control signal $S_C$ and the resulting value of the focal length F, even in the range of values 21 shown in FIG. 4. As illustrated in this figure, the controller 20 is configured to use the data stored in the memory 30 to change the value of the focal length F from an initial value $F_i$, corresponding to a first value, $S_1$, of the control signal $S_C$, to a subsequent value, $F_n$, corresponding to a second value, $S_2$, of the control signal $S_C$ that is smaller than the first value $S_1$, by setting the value of the control signal $S_C$ to a third value, $S_3$, that is within range 22, and subsequently increasing the value of the control signal $S_C$ from the third value $S_3$ to the second value $S_2$. The third value $S_3$ may, as in the present embodiment, be the lowest signal value in the stored variation. Since the changes in the settings of the focal length F of the liquid lens occur on timescales that are greater than the response time (latency) of the liquid lens, changes to F will follow the stored variation (i.e. a portion of the lower part of the hysteresis curve in FIG. 4).

Figure 5:
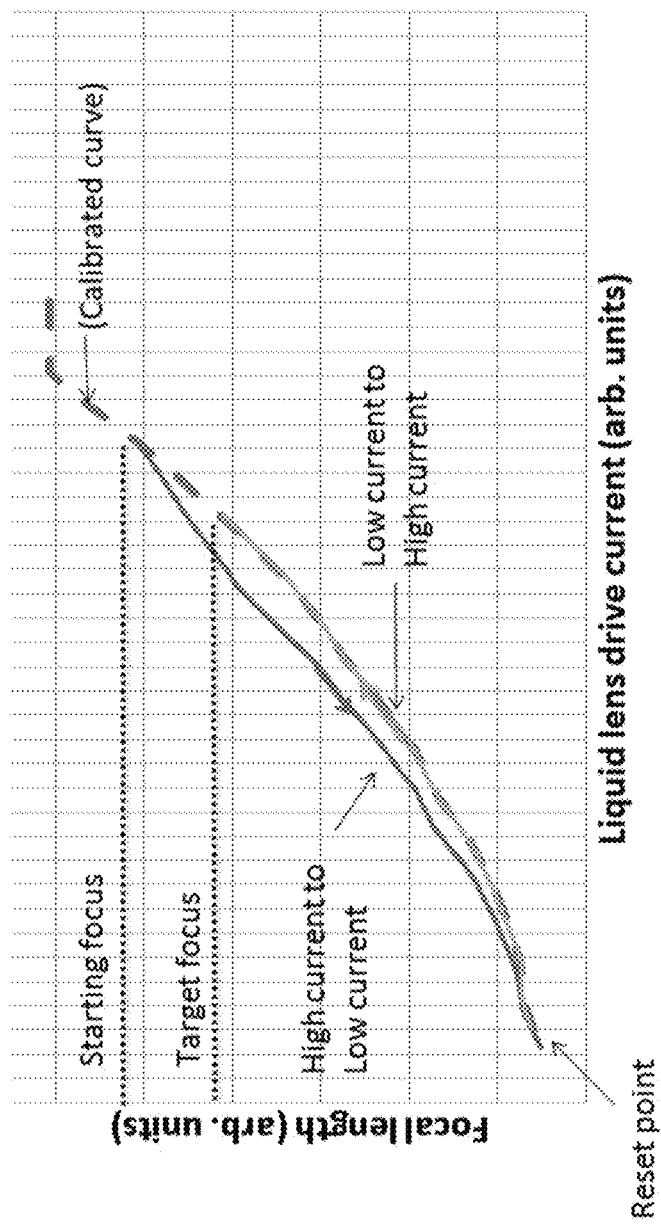
FIG. 5 shows an experimentally determined variation of the focal length of a liquid lens as the drive current is changed from an initial value corresponding to a starting focus value, to a lower value at the 'reset point', and then increased to a value corresponding to the target focus value.

FIG. 5 shows an experimentally determined variation of the focal length of the liquid lens as the drive current (as an example of the control signal $S_C$) is changed from an initial value corresponding to a starting focus value, to a lower value at the 'reset point', and then increased to a value corresponding to the target focus value. As shown in FIG. 5, the measured focal length follows the upper solid curve while the drive current is being decreased towards the rest point, and then follows the stored variation (i.e. the 'calibrated curve' that is stored in memory 30) while the drive current is being increased from the reset point towards the value that corresponds to the target focus.

In an alternative embodiment in which the memory 30 stores data representative of the variation of the focal length F with decreasing values of the drive signal S, the controller 20 is configured to use the stored data to change the value of F from an initial value, $F_i'$, corresponding to a first value of the signal, $S_1'$, to a subsequent value, $F_n'$ corresponding to a second value, $S_2'$, of the control signal $S_C$ that is greater than the first value of the control signal, by setting the value of the control signal $S_C$ to a third value, $S_3'$, that is within the range of values 23, and subsequently decreasing the value of the control signal $S_C$ from the third value $S_3'$ to the second value $S_2'$ (as also illustrated in FIG. 4). In this alternative, the third value $S_3'$ may be the highest signal value in the stored variation.

By controlling the focal length of the liquid lens in this way, the controller 20 can compensate for the hysteresis and ensure that both increments and decrements in the control signal $S_C$ cause the resulting focal length to substantially follow the variation stored in the memory 30. Focus variations due to optical system and/or the geometry of the imaged target can thus be effectively corrected. Similarly, for embodiments where the scan angle of (for example) a mirror is controlled in this way, the controller 20 can compensate for hysteresis effects associated with any mechanical accuracies of a mirror movement mechanism.

Figure 6A:
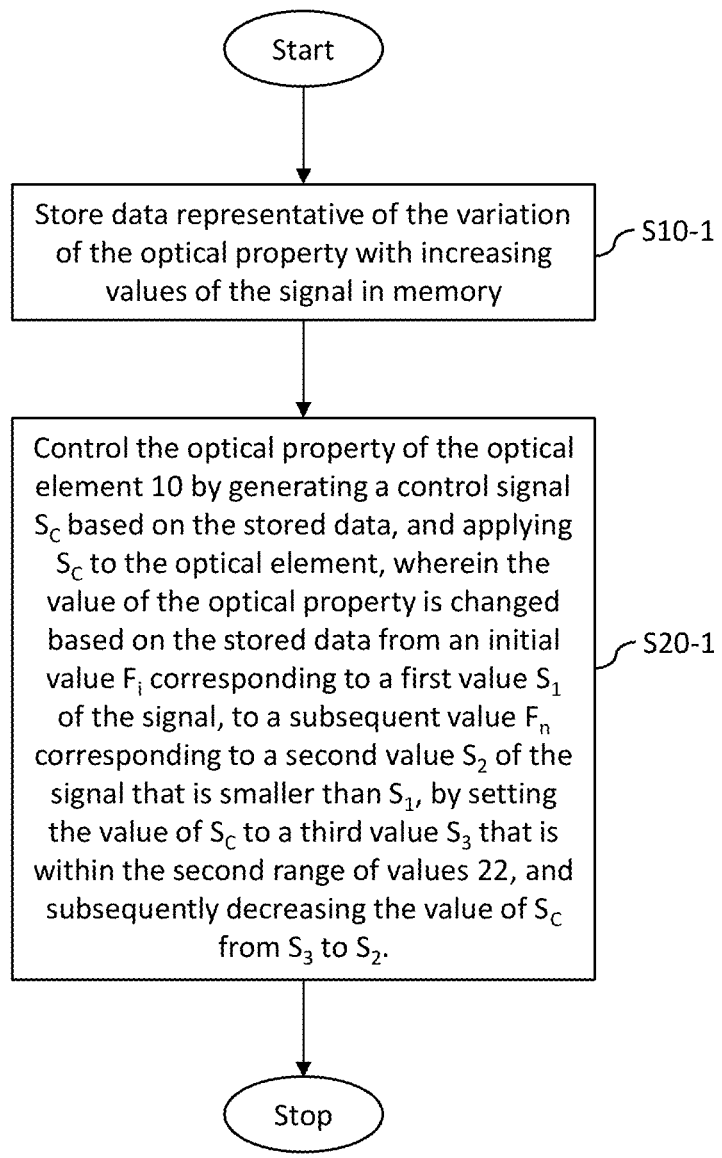
FIGS. 6A and 6B are flow diagrams illustrating alternative methods by which the controller shown in FIG. 1 controls an optical property of the optical element.

The process by which the controller 20 of the present embodiment controls the optical property of the optical element 10 is illustrated in FIG. 6A.

In process S10-1, the controller 20 stores data representative of the variation of the optical property with increasing values of the signal in the memory 30. This data may represent measurements of the optical property obtained by driving the optical element 10 with gradually increasing control signal values and measuring the optical property value obtained at each control signal value, the data corresponding to the measured values themselves or a curve fitted to such data. As noted above, the stored data may alternatively be obtained by modelling the hysteretic behaviour of the optical element 10.

In process S20-1, the controller 20 controls the optical property of the optical element 10 by generating a control signal $S_C$ based on the stored data, and applying $S_C$ to the optical element 10, wherein the value of the optical property is changed based on the stored data from an initial value F, corresponding to a first value $S_1$ of the signal, to a subsequent value $F_n$ corresponding to a second value $S_2$ of the signal that is smaller than $S_1$, by setting the value of $S_C$ to a third value $S_3$ that is within the second range of values 22 (where no hysteresis is observed), and subsequently increasing the value of $S_C$ from $S_3$ to $S_2$. The third value $S_3$ (which may be regarded as a 'reset' point) may, as in the present embodiment, be the lowest signal value in the stored variation.

As detailed above, the controller 20 stores data representative of the variation of the optical property with increasing values of the control signal $S_C$. As such, where the value of the optical property is changed from an initial value corresponding to a first value of the signal to a subsequent value corresponding to a second value of the signal that is larger than the first value of the signal, the controller 20 is not configured to set the value of the signal to a third value that is within the second range of values 22, and then subsequently increase the signal value from the third value to the second (subsequent) value; instead, the controller 20 is in this case configured to change the value of the signal from the first value directly to the subsequent, larger value, since no inaccuracies caused by hysteresis would be introduced by such a change.

Figure 6B:
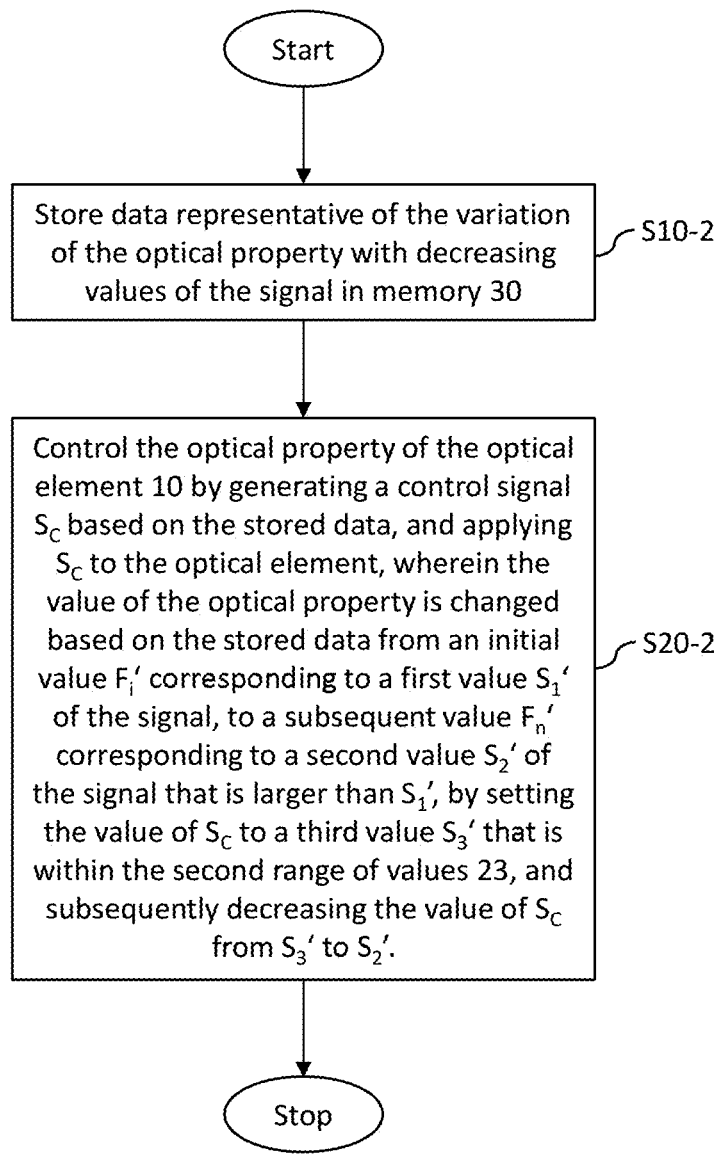

FIG. 6B illustrates the process by which the controller 20 controls the optical property of the optical element 10 in an alternative embodiment, in which the data stored in memory 30 is representative of a variation of the optical property with decreasing values of the signal.

In process S10-2 of FIG. 6B, the controller 20 stores data representative of the variation of the optical property with decreasing values of the signal in the memory 30.

In process S20-2, the controller 20 controls the optical property of the optical element 10 by generating a control signal $S_C$ based on the stored data, and applying $S_C$ to the optical element 10, wherein the value of the optical property is changed based on the stored data from an initial value $F_i'$ corresponding to a first value $S_1'$ of the signal, to a subsequent value $F_n'$ corresponding to a second value $S_2'$ of the signal that is larger than $S_1'$, by setting the value of $S_C$ to a third value $S_3'$ that is within the second range of values 23 (where no hysteresis is observed), and subsequently decreasing the value of $S_C$ from $S_3'$ to $S_2'$. The third value $S_3'$ (which may be regarded as a 'reset' point) may, as in the present embodiment, be the highest signal value in the stored variation.

As detailed above, the controller 20 stores data representative of the variation of the optical property with decreasing values of the control signal $S_C$. As such, where the value of the optical property is changed from an initial value corresponding to a first value of the signal to a subsequent value corresponding to a second value of the signal that is smaller than the first value of the signal, the controller 20 is not configured to set the value of the signal to a third value that is within the second range of values 23, and then subsequently decrease the signal value from the third value to the second (subsequent) value; instead, the controller 20 is in this case configured to change the value of the signal from the first value directly to the subsequent, smaller value, since no inaccuracies caused by hysteresis would be introduced by such a change.

The above methods allow for compensation of hysteresis behaviour in optical systems where the rate at which the focal length or other optical property of the optical system is changed is greater than or equal to the settling time of the focussing mechanism. The accuracy with which a target value of the optical property of the optical element 10 can be set may be increased in an optical system according to the embodiments described above, since the inaccuracies introduced by hysteresis effects are suppressed.

The above-described embodiments compensate for hysteresis behaviour when there is time to reset the signal value to the third value and then to the desired signal value before the subsequent focal length of the focusing mechanism is needed.

However, for some applications, the drive signal must be changed at a high frequency, such that, with the latency of the optical element, it is not possible to "reset" and then change the signal value fast enough. This may occur when the rate of change of focus drive is less than or equal to the settling time of the focusing mechanism. In such situations, the above system and method might not adequately compensate for hysteresis effects.

The controller 20 may therefore be additionally or alternatively operable in a 'continuous' mode of operation in further embodiments hereinafter described, in which the focussing mechanism comprising the optical element 10 is driven continuously by the controller 20. In the following description of these embodiments, features of the optical system that are common to those of the preceding embodiments will not be described again, and the discussion will focus instead on the differences between these embodiments.

The controller 20 in these embodiments is operable in the 'continuous' mode of operation to generate a cyclic signal having one or more discontinuities in each cycle of the cyclic signal, and to set the size of at least one of the one or more discontinuities in each cycle based on the above-described data that is stored in memory 30 or a live system response such that a part of the variation of the optical property with the cyclic signal coincides with a part of the variation represented by the stored data. The controller 20 is further configured to apply the cyclic signal to the optical element 10.

As used herein, the term "cyclic" means a signal that varies in a cyclical manner, in which the period of the cycles may or may not be constant. The frequency of the cyclic signal may thus be fixed or varying.

Figure 7:
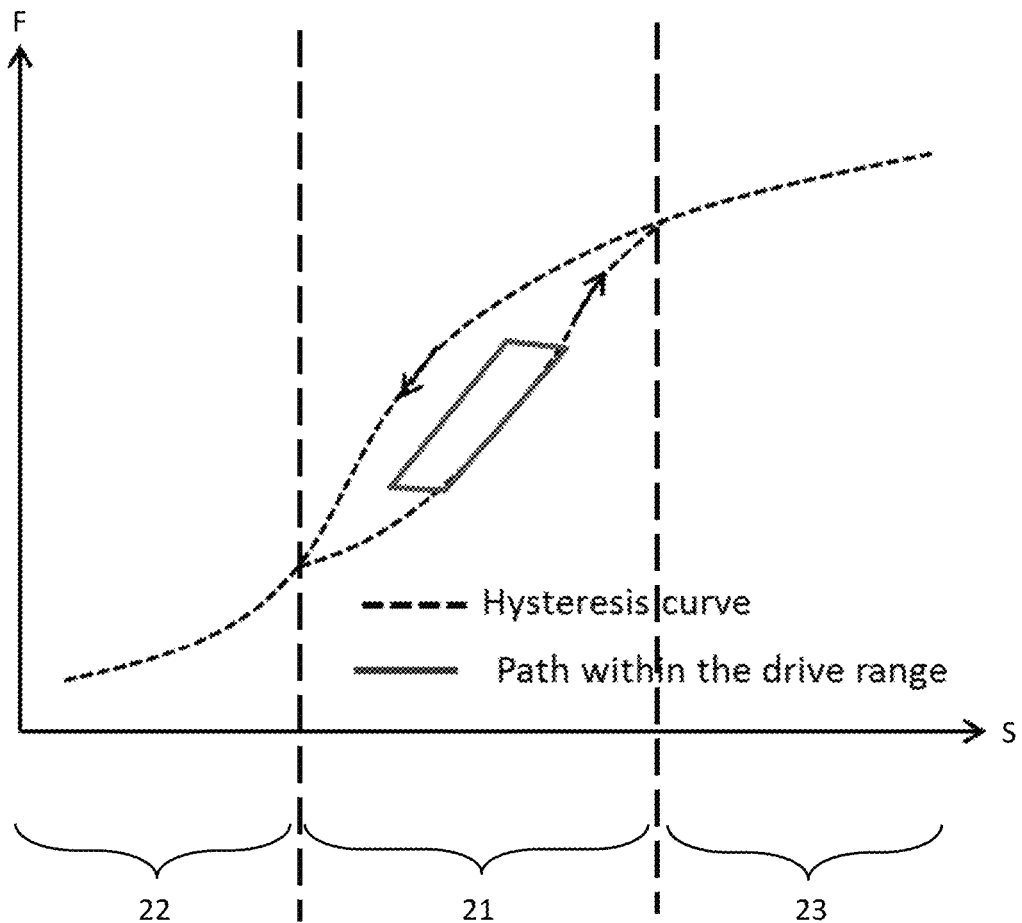
FIG. 7 is a schematic illustration of how the focal length of the optical element changes in response to a cyclic drive signal with two discontinuities per cycle as shown in FIG. 8.
Figure 8:
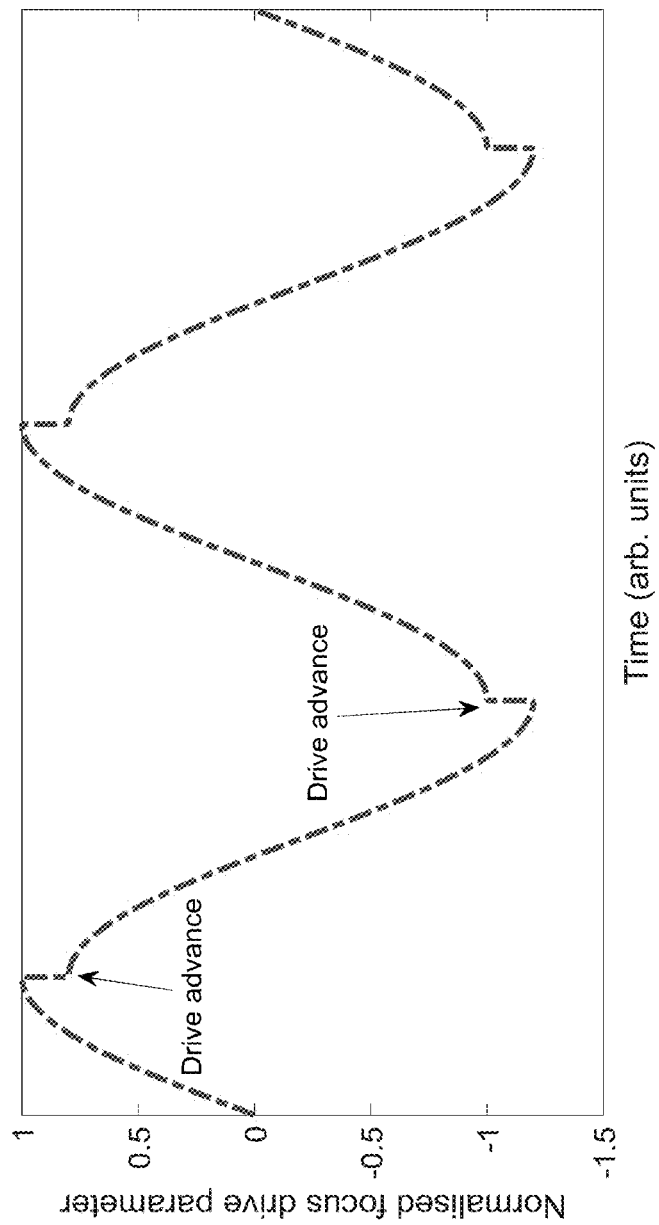
FIG. 8 illustrates a drive signal with two discontinuities per cycle generated by the controller for driving the optical element to produce a variation of the focal length with drive signal as shown in FIG. 7.

By way of example, FIG. 7 illustrates a variation of focal length F of the liquid lens with an applied drive signal S when the drive signal is a cyclic signal (specifically, in the form of a sinusoid with a fixed frequency) that has discontinuities at each of its turning points (i.e. the maxima and minima of the sinusoid), as illustrated in FIG. 8. Cyclic drive signals other than sinusoids are, however, also possible. With a sinusoidal drive signal S having such discontinuities, the variation of F with S during a cycle with a fixed period of S can be approximated as a parallelogram, as illustrated in FIG. 7. Specifically, the variation of F with S follows the calibration (hysteresis) curve representing the stored data while the sign of the change in S (e.g. positive in the case of increasing values of S) is the same as the sign of the change in S used to record or otherwise determine the calibration curve stored in memory 30. Thus, as the value of S increases from one discontinuity shown in FIG. 8 (labelled "drive advance") to the next, the resulting values of focal length F follow the dashed curve shown in FIG. 7. The discontinuity provided at each maximum of the drive signal S shown in FIG. 8 has no significant effect on the focal length F, which stays substantially constant when the discontinuity occurs (owing to the change in S at the discontinuity occurring on a smaller time scale than the response time of the liquid lens), as illustrated by the top horizontal side of the parallelogram in FIG. 7. The discontinuity in the drive signal S, however, allows the variation of focal length F with decreasing values of S from one discontinuity in S to the next discontinuity in S (see FIG. 8) to follow a curve in the F-S plane that has a similar slope to the variation of F with S while S increases between one discontinuity and the next, as also shown in FIG. 7. The next discontinuity in S similarly has little or no effect on the value of F (see bottom side of the parallelogram in FIG. 7) so that the loop followed by the variation of F with S becomes closed.

Thus, as S increases after having been set at a minimum value of S to the next maximum value of S, then abruptly decreases when the maximum value of S is reached, then decreases to the next minimum value of S, and then abruptly increases when the minimum value of S is reached, as shown in FIG. 8, the variation of F with S follows one loop of the parallelogram shown in FIG. 7, with the focal length F smoothly increasing to a maximum value before smoothly decreasing to a minimum value, as would be the case with an applied sinusoidal drive signal and no hysteresis being exhibited by the optical element 10. The discontinuities in the cyclic drive signal S thus compensate for the hysteretic behaviour of the optical element 10.

Figure 9:
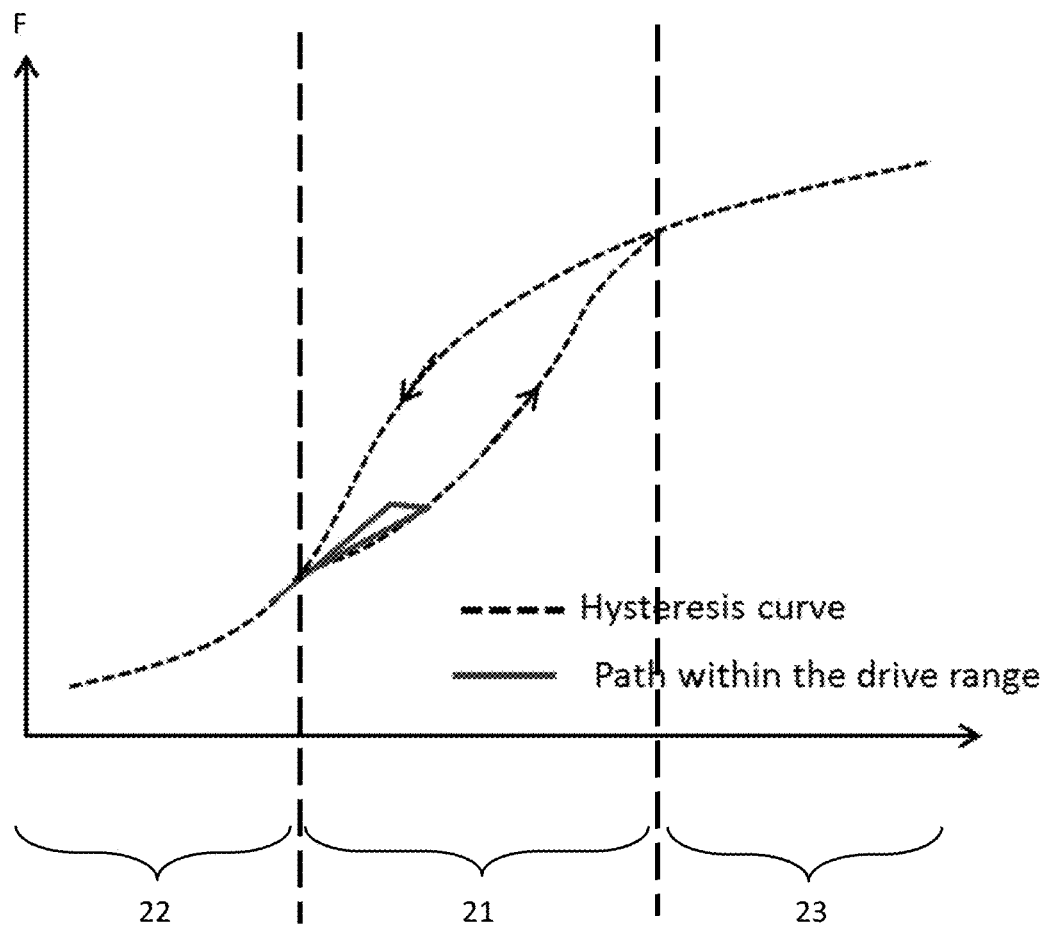
FIG. 9 is a schematic illustration of how the focal length of the optical element changes in response to a cyclic drive signal with a single discontinuity per cycle as shown in FIG. 10.

Although the controller 20 may thus be operable in the 'continuous' mode to generate a cyclic drive signal S having two discontinuities in each cycle of the drive signal, and to set the size of both of the discontinuities based on the stored calibration data such that a part of the variation of the focal length F with the S coincides with a part of the variation represented by the stored data, the controller 20 may alternatively generate a cyclic drive signal S having only one discontinuity in each cycle of the drive signal, and to set the size of this single discontinuity based on the stored calibration data such that a part of the variation of the focal length F with the S coincides with a part of the variation represented by the stored data; this alternative is applicable in cases where the range of focal lengths F covered during a cycle of the drive signal S is not contained entirely within a range of focal lengths F corresponding to values of S in hysteresis region 21 shown in FIG. 4, but extends into one of the ranges of F corresponding to values of S in non-hysteresis region 22 or 23 also shown in FIG. 4. For example, the drive range may include a transition from hysteresis region 21 to non-hysteresis region 22, as illustrated in FIG. 9.

Figure 10:
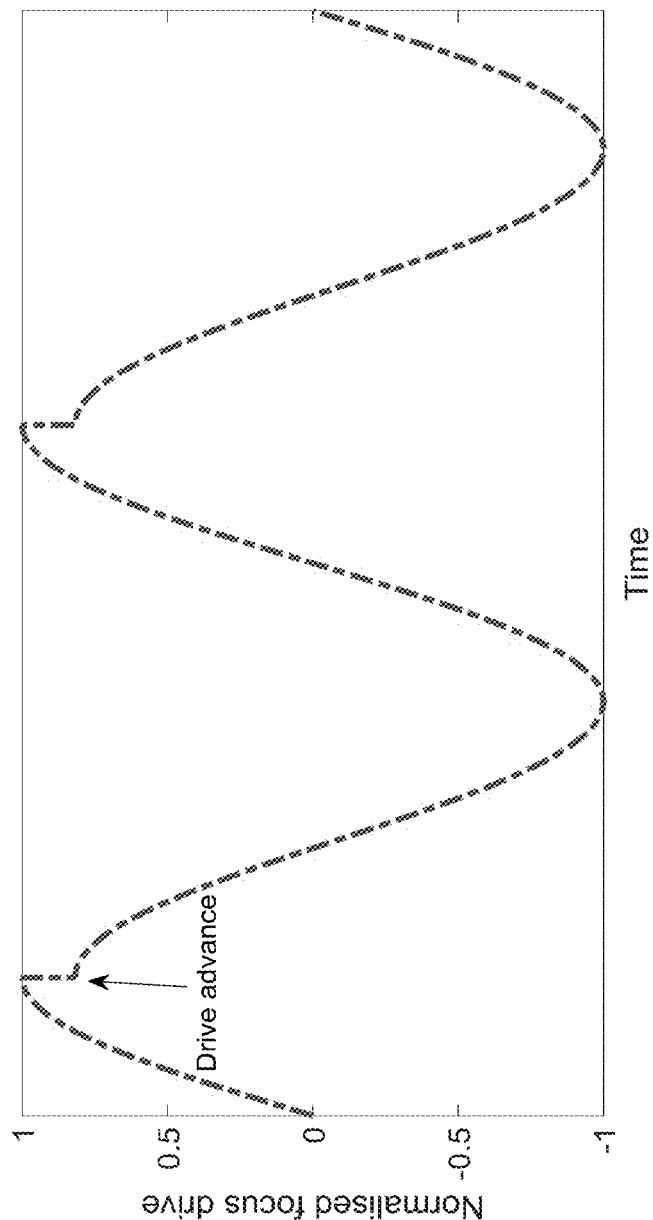
FIG. 10 illustrates a drive signal with a single discontinuity per cycle generated by the controller for driving the optical element to produce a variation of the focal length with drive signal as shown in FIG. 9.

In these cases, the controller 20 is configured to generate an asymmetric drive signal as shown in FIG. 10, with a discontinuity at each maximum of the sinusoidal drive signal S but no discontinuity at any of the minima. In this example, the drive advance is thus applied only for one turning point of the drive signal which is within the hysteresis region 21. No drive advance is required for the turning point within the no-hysteresis region 22. It can be seen from FIG. 9 that the slope of the drive curve is different for low-to-high and the high-to-low directions of change of the drive signal S. Applying an asymmetric drive advance as in FIG. 10 would result in this different slope for the drive.

Figure 11:
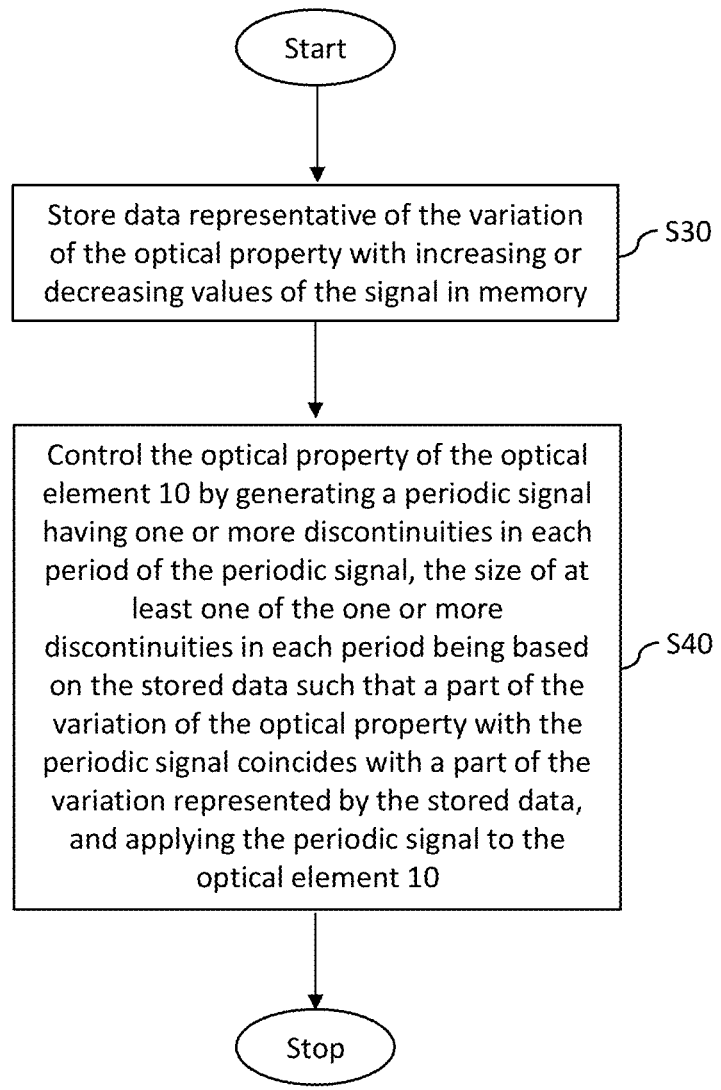
FIG. 11 is a flow diagram illustrating an alternative method by which the controller shown in FIG. 1 controls an optical property of the optical element.

The process by which the controller 20 of the present embodiment controls the optical property of the optical element 10 is summarised in FIG. 11.

In process S30, the controller 20 stores data representative of the variation of the optical property with either increasing values of the signal or decreasing values of the signal in the memory 30.

In process S40, the controller 20 controls the optical property of the optical element 10 by generating a cyclic signal having one or more discontinuities in each cycle of the cyclic signal, the size of at least one of the one or more discontinuities in each cycle being based on the stored data such that a part of the variation of the optical property with the cyclic signal coincides with a part of the variation represented by the stored data, and applying the cyclic signal to the optical element 10.

Such method may allow the optical property of the optical element to be controlled more accurately by compensating for hysteresis effects in cases where the applied signal is cyclic and the variable or fixed frequency of the applied cyclic signal varies faster than the latency of the optical element.

The invention claimed is:

1. An optical system comprising:
an optical element responsive to an applied signal to vary an optical property of the optical element, the variation of the optical property with the applied signal exhibiting hysteresis in a first range of values of the signal, and no hysteresis in a second range of values of the signal;
a non-transitory computer-readable storage medium storing data representative of the hysteresis curve which indicates the variation of the optical property with increasing values of the signal and decreasing values of the signal; and
a controller configured to continuously control the optical property of the optical element by:
generating, based on the stored data, a cyclic signal having one or more discontinuities in each cycle of the cyclic signal, and setting the size of at least one of the one or more discontinuities in each cycle based on the stored data such that a part of the variation of the optical property with the cyclic signal coincides with a part of the variation represented by the stored data; and
applying the cyclic signal to the optical element.

2. The optical system of claim 1, wherein the cyclic signal is sinusoidal.

3. The optical system of claim 1, wherein the optical property is a focal length of the optical element.

4. The optical system of claim 3, wherein the optical element is a liquid lens, and the optical property is a focal length of the liquid lens.

5. The optical system of claim 1, wherein the optical element is an optical scanning element, and the optical property is a scan angle of the optical scanning element.

6. The optical system of claim 1, wherein the cyclic signal is a current signal or a voltage signal.

7. A method of controlling an optical property of an optical element, wherein the optical element is responsive to an applied signal to vary the optical property, and the variation of the optical property with the applied signal exhibits hysteresis in a first range of values of the electrical signal, and no hysteresis in a second range of values of the signal, the method comprising:
storing data representative of a hysteresis curve which indicates the variation of the optical property with increasing values of the signal and decreasing values of the signal; and
continuously controlling the optical property of the optical element by generating, based on the stored data, a cyclic signal having one or more discontinuities in each cycle of the cyclic signal, the size of at least one of the one or more discontinuities in each cycle being based on the stored data such that a part of the variation of the optical property with the cyclic signal coincides with a part of the variation represented by the stored data, and applying the cyclic signal to the optical element.

8. The method of claim 7, wherein the cyclic signal is sinusoidal.

9. The method of claim 7, wherein the optical property is a focal length of the optical element.

10. The method of claim 9, wherein the optical element is a liquid lens, and the optical property is a focal length of the liquid lens.

11. The method of claim 7, wherein the optical element is an optical scanning element, and the optical property is a scan angle of the optical scanning element.

12. The method of claim 7, wherein the cyclic signal is a current signal or a voltage signal.

13. The optical system of claim 1, wherein the discontinuities in each cycle are at at least one of maxima or minima of the cyclical signal in each cycle.

14. The method of claim 7, wherein the discontinuities in each cycle are at at least one of maxima or minima of the cyclical signal in each cycle.

* * * * *